(12) United States Patent
Kim et al.

(10) Patent No.: US 11,133,507 B2
(45) Date of Patent: Sep. 28, 2021

(54) LITHIUM ELECTRODE AND LITHIUM SECONDARY BATTERY COMPRISING SAME

(71) Applicant: LG CHEM, LTD., Seoul (KR)

(72) Inventors: Kihyun Kim, Daejeon (KR); Doo Kyung Yang, Daejeon (KR); Taek Gyoung Kim, Daejeon (KR); Jieun Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 175 days.

(21) Appl. No.: 16/470,166

(22) PCT Filed: Mar. 13, 2018

(86) PCT No.: PCT/KR2018/002934
§ 371 (c)(1),
(2) Date: Jun. 14, 2019

(87) PCT Pub. No.: WO2018/212438
PCT Pub. Date: Nov. 22, 2018

(65) Prior Publication Data
US 2019/0319272 A1 Oct. 17, 2019

(30) Foreign Application Priority Data

| May 15, 2017 | (KR) | 10-2017-0059849 |
| Nov. 28, 2017 | (KR) | 10-2017-0160725 |
| Mar. 2, 2018 | (KR) | 10-2018-0025118 |

(51) Int. Cl.
*H01M 4/62* (2006.01)
*H01M 4/04* (2006.01)
(Continued)

(52) U.S. Cl.
CPC ........... *H01M 4/628* (2013.01); *H01M 4/049* (2013.01); *H01M 4/134* (2013.01);
(Continued)

(58) Field of Classification Search
CPC .................................................... H01M 4/366
See application file for complete search history.

(56) References Cited

U.S. PATENT DOCUMENTS 4,981,672 A * 1/1991 de Neufville ........... H01M 4/13
423/464
2002/0182488 A1 12/2002 Cho et al.
(Continued)

FOREIGN PATENT DOCUMENTS

| JP | H07-037578 A | 2/1995 |
| JP | 8-7923 A | 1/1996 |

(Continued)

OTHER PUBLICATIONS

Scifinder structure search 1.*
(Continued)

*Primary Examiner* — Nathanael T Zemui
(74) *Attorney, Agent, or Firm* — Birch, Stewart, Kolasch & Birch, LLP

(57) ABSTRACT

A lithium electrode and a lithium secondary battery including the same, and in particular, to a lithium electrode including a lithium metal layer; and a surface treatment layer formed on the lithium metal layer, wherein the surface treatment layer includes a surface treatment compound including a functional group capable of bonding with lithium metal and a hydrocarbon group substituted with one or more fluorine. By being provided with a surface treatment layer including a specific functional group, the lithium electrode improves stability of lithium metal as well as suppressing side reactions on the surface, and thereby allows high capacity, high stability and long lifetime of a lithium secondary battery.

5 Claims, 7 Drawing Sheets

(51) Int. Cl.
  *H01M 4/134* (2010.01)
  *H01M 4/1395* (2010.01)
  *H01M 4/36* (2006.01)
  *H01M 4/38* (2006.01)
  *H01M 10/052* (2010.01)
  *H01M 4/02* (2006.01)

(52) U.S. Cl.
  CPC ......... *H01M 4/1395* (2013.01); *H01M 4/366* (2013.01); *H01M 4/382* (2013.01); *H01M 10/052* (2013.01); *H01M 2004/027* (2013.01)

(56) References Cited

U.S. PATENT DOCUMENTS

| | | | |
|---|---|---|---|
| 2004/0058232 A1* | 3/2004 | Kim | H01M 4/0445 429/137 |
| 2005/0208385 A1 | 9/2005 | Nirasawa et al. | |
| 2009/0176164 A1* | 7/2009 | Matsui | H01G 9/038 429/342 |
| 2012/0231336 A1 | 9/2012 | Kim et al. | |
| 2013/0095605 A1 | 4/2013 | Goto et al. | |
| 2014/0127547 A1 | 5/2014 | Park et al. | |
| 2018/0006333 A1* | 1/2018 | Brew | H01M 4/131 |

FOREIGN PATENT DOCUMENTS

| | | |
|---|---|---|
| JP | 2003-31260 A | 1/2003 |
| JP | 2004-055320 A | 2/2004 |
| JP | 2014-137843 A | 7/2014 |
| JP | 2014-199815 A | 10/2014 |
| JP | 2014-531720 A | 11/2014 |
| JP | 2016-191102 A | 11/2016 |
| KR | 10-0413796 B1 | 1/2004 |
| KR | 10-2004-0026208 A | 3/2004 |
| KR | 10-0450208 B1 | 9/2004 |
| KR | 10-0485092 B1 | 4/2005 |
| KR | 10-2012-0101970 A | 9/2012 |
| KR | 10-2013-0021439 A | 3/2013 |
| KR | 10-2014-0030043 A | 3/2014 |
| KR | 20140030043 A * | 3/2014 |
| KR | 10-2014-0125970 A | 10/2014 |
| KR | 10-2016-0034183 A | 3/2016 |
| KR | 10-1601066 B1 | 3/2016 |
| KR | 10-2016-0052351 A | 5/2016 |
| WO | WO 2019/078526 A2 | 4/2019 |

OTHER PUBLICATIONS

Scifinder structure search 2.*
Scifinder structure search 3.*
STIC search.*
Extended European Search Report, dated Dec. 3, 2019, for European Application No. 18802680.1.
International Search Report for PCT/KR2016/002934 (PCT/ISA/210) dated Nov. 15, 2018, with English translation.
Qian et al., "High rate and stable cycling of lithium metal anode", Nature Communications, vol. 6, No. 6362, Feb. 20, 2015, pp. 1-9.

* cited by examiner

LITHIUM ELECTRODE AND LITHIUM SECONDARY BATTERY COMPRISING SAME

TECHNICAL FIELD

This application claims the benefits of Korean Patent Application No. 10-2017-0059849, filed on May 15, 2017, Korean Patent Application No. 10-2017-0160725, filed on Nov. 28, 2017 and Korean Patent Application No. 10-2018-0025118, filed on Mar. 2, 2018 with the Korean Intellectual Property Office, the disclosure of which are herein incorporated by reference in their entirety.

The present invention relates to a lithium electrode and a lithium secondary battery including the same.

BACKGROUND ART

As portable electronic devices, electric vehicles and large capacity power storage system and the like have been recently developed, demands for large capacity batteries as an energy source have increased, and in response to such demands, extensive studies on batteries have been performed. Among various secondary batteries, lithium, secondary batteries having advantages of high energy density, discharge voltage and output stability have received attention.

A lithium secondary battery has a structure of laminating or winding an electrode assembly including a positive electrode, a negative electrode, and a separator interposed between the positive electrode and the negative electrode, and is formed by embedding the electrode assembly in a battery case, and injecting a non-aqueous liquid electrolyte thereinto. Herein, capacity of the lithium secondary battery varies depending on the types of an electrode active material, and since sufficient capacity as theoretical capacity is not secured during an actual operation, commercialization has not been accomplished yet.

In order to increase the capacity of the lithium secondary battery, metal-based materials such as silicon (4,200 mAh/g) or tin (990 mAh/g) exhibiting high storage capacity properties through an alloying reaction with lithium have been used as a negative electrode active material. However, when using metals such as silicon or tin as the negative electrode active material, the volume greatly expands by approximately 4 times in a process of alloying with lithium during charge, and contracts during discharge. Due to such large variations in the electrode volume repeatedly occurring during charge and discharge, the active materials are slowly micronized and detached from the electrode causing a rapid capacity decrease. As a result, commercialization has not been successful since stability and reliability are difficult to secure.

Compared to the above-mentioned negative electrode active materials, lithium metal has excellent theoretical capacity of 3,860 mAh/g and very low standard reduction potential (vs. standard hydrogen electrode; SHE) of −3.045 V, which allows to realize a battery having high capacity and high energy density. And as interests in lithium-sulfur and lithium-air batteries have recently increased, the lithium metal has been actively studied as the negative electrode active material of the lithium secondary battery.

However, when using the lithium metal as the negative electrode of the lithium secondary battery, the lithium metal reacts with an electrolyte, impurities, a lithium salt and the like to form a passivation layer (solid electrolyte interphase; SEI), and such a passivation layer causes local differences in the current density forming dendritic dendrite on the lithium metal surface. The lithium dendrite causes a battery internal short circuit and inactive lithium (dead lithium) as well as shortening a lifetime of the lithium secondary battery, which adds physical and chemical instability of the lithium secondary battery, reduces a cycle lifetime, and adversely affects battery stability. In addition thereto, the passivation layer is thermally unstable, and may be slowly destroyed by increased electrochemical energy and thermal energy when consistently progressing charge and discharge of the battery, or, particularly, stored at a high temperature in a completely charged state. Due to such passivation layer destruction, side reactions produced by the exposed the lithium metal surface directly reacting with the electrolyte solvent and being decomposed consistently occurs, and as a result, the negative electrode resistance increases, and the battery charge and discharge efficiency decreases. In addition, the solvent of the electrolyte is consumed when forming the passivation layer and a problem of shortening the battery lifetime occurs due to byproducts, gases and the like generated from various side reactions such as passivation layer formation and destruction, and electrolyte decomposition.

Due to such high reactivity of the lithium metal, the lithium secondary battery using the lithium metal as the negative electrode has not been commercialized yet.

In view of the above, various methods such as introducing a protective layer on the lithium metal surface, increasing the lithium salt content of the electrolyte liquid or adding additives have been studied.

As one example, Korean Patent Application Publication No. 2016-0034183 discloses that electrolyte liquid loss and dendrite formation may be prevented by forming a protective layer with a polymer matrix capable of accumulating an electrolyte liquid while protecting a negative electrode on a negative electrode active layer including lithium metal or a lithium alloy.

In addition, Korean Patent Application Publication No. 2016-0052351 discloses that stability and lifetime properties of a lithium secondary battery may be improved by including a lithium dendrite absorbing material in a polymer protective layer formed on a lithium metal surface and thereby suppressing lithium dendrite growth.

These patents have somewhat suppressed the side reactions between an electrolyte liquid and lithium metal by stabilizing a surface of the lithium metal through a protective layer, however, the effect has not been sufficient. In addition, the protective layer becomes hard when charging and discharging a battery or degeneration such as swelling occurs when brought into contact with the electrolyte, which becomes a limit to be used in a lithium secondary battery. Accordingly, development of a lithium metal electrode having excellent stability has been required more.

PRIOR ART DOCUMENTS

Patent Document

Korean Patent Application Publication No. 2016-0034183 (2016 Mar. 29), Negative electrode for rechargeable lithium battery and rechargeable lithium battery comprising same Non-Patent Document Jiangfeng Qian et al., High rate and stable cycling of lithium metal anode, Nature Communications, 2015, 6, 6362

DISCLOSURE

Technical Problem

As a result of extensive studies in view of the above, the inventors of the present invention have identified that, when introducing a surface treatment layer on a lithium electrode using a surface treatment compound including specific functional groups, electrochemical properties and stability of the lithium metal electrode is improved enhancing battery performance and lifetime, and have completed the present invention.

Accordingly, an aspect of the present invention provides a lithium electrode having excellent stability and performance.

In addition, another aspect of the present invention provides a lithium secondary battery including the lithium electrode.

Technical Solution

According to an aspect of the present invention, there is provided a lithium electrode comprising a lithium metal layer and a surface treatment layer formed on the lithium metal layer, wherein the surface treatment layer includes a surface treatment compound comprising a functional group capable of bonding with lithium metal and a hydrocarbon group substituted with at least one fluorine.

The functional group capable of bonding with lithium metal may be a thiol group, an amine group or a hydroxyl group.

The surface treatment compound may be represented by the following Formula 1:

[Formula 1]

wherein A, B, O, X, m and n are as described in the specification.

The surface treatment compound may comprise at least one selected from the group consisting of 1H,1H,2H,2H,3H,3H-perfluoroundecylthiol, 1H,1H,2H,2H-perfluorodecanethiol, 1H,1H,2H,2H-perfluorononanethiol, 1H,1H,2H,2H-perfluoro-1-octanethiol, 1H,1H-perfluorooctylthiol, 1H,1H-perfluoropropylthiol, 2,2,2-trifluoroethanethiol, 1H,1H,2H,2H-perfluoro-1-hexanethiol, 2,3,4,5,6-pentafluorothiophenol, 2,3,5,6-tetrafluorobenzenethiol, 2,4-difluorothiophenol, 3,4-difluorothiophenol, 2-fluorothiophenol, 3-fluorothiophenol, 4-fluorothiophenol, 2-(trifluoromethoxy)thiophenol, 3-(trifluoromethoxy)thiophenol, 2-(trifluoromethyl)benzenethiol, 2,6-difluorobenzyl mercaptan, 3,4-difluorobenzyl mercaptan, 3,5-difluorobenzyl mercaptan, 4-fluorobenzyl mercaptan, 3,5-bis(trifluoromethyl)benzenethiol, 4-trifluoromethylbenzyl mercaptan, 1H,1H-perfluorooctylamine, 1H,1H-heptafluorobutylamine, 1H,1H-perfluorononylamine, 4-(1H,1H,2H,2H-perfluorodecyl)benzylamine, 2,2,3,3,4,4,4-heptafluorobutylamine, 2,2,3,3,3-pentafluoropropylamine, 3,3,3-trifluoropropylamine, 4-fluoro-α-methylbenzyl alcohol, 2-fluoro-3-methylbenzyl alcohol, 4-fluoro-3-methylbenzyl alcohol, 5-fluoro-2-methylbenzyl alcohol, 4-fluoro-3-nitrobenzyl alcohol, 2-fluoro-5-nitrobenzyl alcohol, 2-fluoro-3-(trifluoromethoxy)benzyl alcohol, 2-fluoro-3-nitrobenzyl alcohol, 2-fluoro-5-methoxybenzyl alcohol, 3-fluoro-5-(trifluoromethyl)benzyl alcohol, 3-fluoro-5-methoxybenzyl alcohol, 4-fluoro-3-(trifluoromethyl)benzyl alcohol, 4-fluoro-3-methoxybenzyl alcohol, 5-fluoro-2-(trifluoromethyl)benzyl alcohol, 5-fluoro-2-nitrobenzyl alcohol, DL-4-fluoro-α-propylbenzyl alcohol, 3-fluorobenzyl alcohol and 4-fluorophenethyl alcohol.

The lithium metal layer may include lithium metal or a lithium alloy.

According to the aspect of the present invention, there is provided a method for preparing a lithium electrode comprising (a) preparing a lithium metal layer; (b) preparing a surface treatment solution including a surface treatment compound comprising a functional group capable of bonding with lithium metal and a hydrocarbon group substituted with at least one fluorine; and (c) forming a surface treatment layer by reacting the lithium metal layer of (a) with the surface treatment solution prepared in (b) under an inert atmosphere, and then drying the result.

The surface treatment compound may be included in the surface treatment solution in an amount of from 0.1 to 10% by weight, based on the total weight of the surface treatment solution.

According to another aspect of the present invention, there is provided a lithium secondary battery including the lithium electrode as a negative electrode.

Advantageous Effects

By including a surface treatment layer formed with a surface treatment compound including a functional group capable of bonding with lithium and a hydrocarbon group substituted with one or more fluorine on a lithium metal layer, a lithium electrode according to the present invention enables high capacity and long lifetime of a lithium secondary battery through suppressing side reactions while enhancing lithium metal stability.

BEST MODE

Figure 1:
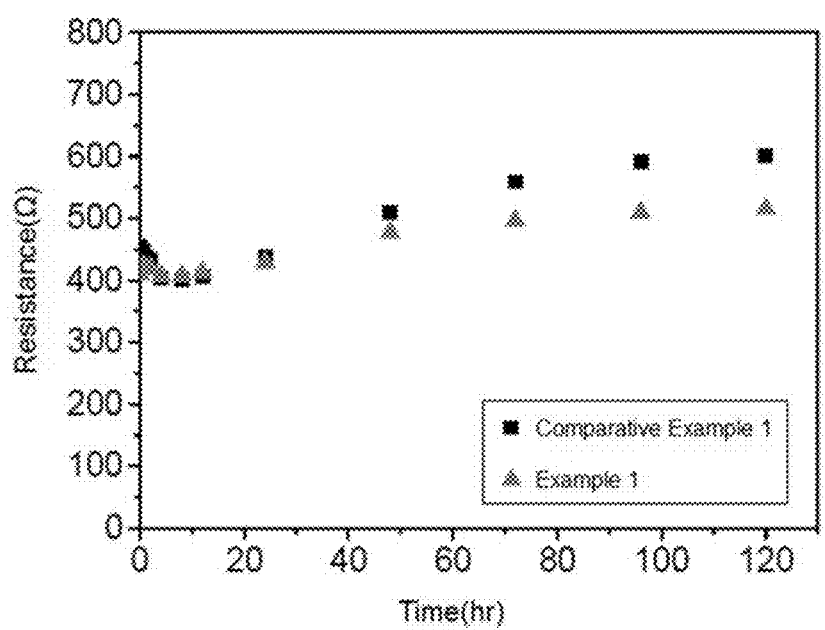
FIG. 1 is a graph showing a result of evaluating resistance of a Li/Li symmetric cell according to Experimental Example 1 of the present invention.

Hereinafter, the present invention will be described in more detail.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

As applications of lithium secondary batteries expand starting from mobile phones, wireless electronic devices to electric vehicles, there have been demands for lithium secondary batteries that are smaller, lighter, thinner and portable, and having high performance, high stability and high reliability.

In response to such demands, lithium metal batteries (LMB) using lithium metal as a negative electrode have recently received attention. Lithium metal has high energy density (3,860 mAh/g) while having low oxidation/reduction potential (−3.045 V vs standard hydrogen electrode) and atomic weight (6.94 g/a.u.), and is thereby expected as a negative electrode material of a high capacity lithium secondary battery.

However, as described above, the lithium metal is highly reactive and is vulnerable in terms of stability. In addition thereto, a lithium-sulfur battery using a sulfur series material as a positive electrode active material has a problem of accelerating decreases in the lithium metal electrode efficiency and lifetime due to side reactions between lithium metal and polysulfide eluted from a positive electrode.

For this, a method of introducing a polymer protective layer or an inorganic solid protective layer on a lithium metal surface, and the like, have been used in the prior art, however, the stability of the lithium metal electrode has not been effectively improved.

In order to enhance the stability by suppressing the side reactions of the lithium metal electrode and to secure effects of improving the performance and lifetime of the lithium secondary battery including the same in view of the above, the present invention provides a lithium electrode introducing a surface treatment layer including a surface treatment compound including specific functional groups on lithium metal.

Specifically, the lithium electrode according to the present invention comprises a lithium metal layer; and a surface treatment layer formed on the lithium metal layer, wherein the surface treatment layer includes a surface treatment compound including a functional group capable of bonding with lithium metal and a hydrocarbon group substituted with at least one fluorine.

The lithium metal layer is a negative electrode active material capable of reversibly intercalating and deintercalating lithium ions, and may include lithium metal or a lithium alloy.

Examples of the lithium alloy may include alloys of lithium and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

Preferably, the lithium metal layer may be lithium metal, and specifically, may have a form of lithium metal thin film or lithium metal powder.

The thickness of the lithium metal layer is not particularly limited, but, for example, may be in a range of from 5 µm to 200 µm and preferably from 10 µm to 100 µm. When the lithium metal layer has a thickness corresponding to the above-mentioned range, ion and electron transfer in the negative electrode may be smooth.

The lithium metal layer may selectively further include a current collector.

The current collector is for supporting the lithium metal layer described above, and is not particularly limited as long as it has excellent conductivity and is electrochemically stable in a voltage region of a lithium secondary battery. For example, copper, stainless steel, aluminum, nickel, titanium, palladium, baked carbon, copper or stainless steel of which surface is treated with carbon, nickel, silver and the like, aluminum-cadmium alloys, and the like, may be used.

The current collector may strengthen binding strength with the lithium metal layer by forming micro-unevenness on its surface, and various forms such as films, sheets, foil, meshes, nets, porous bodies, foams and non-woven fabrics may be used.

The thickness of the current collector is not particularly limited, and may be properly determined depending on the application. For example, the current collector may have a thickness of 3 µm to 500 µm, preferably 5 µm to 100 µm and more preferably 5 µm to 50 µm. When the thickness of the current collector is less than the above-mentioned range, durability decreases, whereas, when the thickness is greater than above-mentioned range, capacity per volume of a lithium secondary battery may be reduced.

The method of forming the lithium metal layer is not particularly limited, and methods of forming layers or membranes commonly used in the prior art may be used. For example, methods of compression, coating or deposition may be used. In addition thereto, a case of assembling a battery in a state with no lithium thin film on a current collector, and then forming a metal lithium thin film on a metal plate by initial charge is also included in the present invention. In addition, in the negative electrode active material layer or the lithium metal plate, the width may be adjusted depending on the electrode form so as to readily prepare the electrode.

The surface treatment layer is formed on the lithium metal layer described above, and includes a surface treatment compound including a functional group capable of bonding with lithium metal and a hydrocarbon group substituted with one or more fluorine. Herein, by the surface treatment compound bonding with the lithium metal through the functional group capable of bonding with lithium metal, a film-type surface treatment layer is formed on the lithium metal electrode surface. In addition, by the surface treatment compound suppressing side reactions with an electrolyte or byproducts produced while operating a battery through including the hydrocarbon group substituted with at least one fluorine, the stability of the lithium metal electrode is more improved, and the charge and discharge efficiency, lifetime and reliability of the lithium secondary battery may be greatly enhanced.

In the present invention, the surface treatment compound may be represented by the following Formula 1:

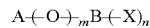  [Formula 1]

wherein A is an alkyl group having 1 to 20 carbon atoms unsubstituted or substituted with fluorine; an alkenyl group having 2 to 20 carbon atoms unsubstituted or substituted with fluorine; an alkynyl group having 2 to 20 carbon atoms unsubstituted or substituted with fluorine; a cycloalkyl group having 3 to 20 carbon atoms unsubstituted or substituted with fluorine; or an aryl group having 6 to 40 carbon atoms unsubstituted or substituted with fluorine, or is absent, B is a simple bond; an alkanediyl group having 1 to 10 carbon atoms unsubstituted or substituted with fluorine; an alkenediyl group having 2 to 10 carbon atoms unsubstituted or substituted with fluorine; an unsubstituted alkynediyl group having 2 to 10 carbon atoms; a cycloalkyl group having 3 to 20 carbon atoms unsubstituted or substituted with fluorine; or an arylene group having 6 to 40 carbon atoms unsubstituted or substituted with fluorine; or an arylalkylene group having 6 to 40 carbon atoms unsubstituted or substituted with fluorine, at least one of A and B is substituted with fluorine, O is oxygen, X is each independently selected from among a thiol group, an amine group or a hydroxyl group, m is 0 or 1, and n is an integer of 1 to 3.

The term "hydrocarbon group" as used in the present invention means all organic groups formed with carbon and hydrogen, and may include all known structures such as an alkyl group, an alkenyl group, an alkynyl group, an aryl group, an aralkyl group or a heteroaryl group. The carbon in the hydrocarbon group may be replaced by at least one selected from the group consisting of oxygen (O), nitrogen (N) and sulfur (S). The hydrocarbon group includes linear, branched, monocyclic or multicyclic, and at least one hydrogen atoms included in the hydrocarbon group may be substituted by any one or more substituents (for example, alkyl, alkenyl, alkynyl, heterocyclic, aryl, heteroaryl, acyl, oxo, imino, thioxo, cyano, isocyano, amino, azido, nitro, hydroxyl, thiol, halo and the like).

The term "alkyl group" as used in the present invention may be linear or branched, and although not particularly limited thereto, the number of carbon atoms is from 1 to 20, and specifically from 1 to 10 preferably. Specific examples thereof may include a methyl group, an ethyl group, a propyl group, an isopropyl group, a butyl group, a t-butyl group, a pentyl group, a hexyl group, a heptyl group and the like, but are not limited thereto.

The term "alkenyl group" as used in the present invention means, unless mentioned otherwise, a hydrocarbon group having 2 to 20 carbon atoms including f t least one carbon-carbon double bond, but is not limited thereto.

The term "alkynyl group" as used in the present invention means, unless mentioned otherwise, a hydrocarbon group having 2 to 20 carbon atoms including at least one carbon-carbon triple bond, but is not limited thereto.

The term "cycloalkyl group" as used in the present invention means a non-aromatic carbon-based ring formed with at least 3 carbon atoms. The cycloalkyl group may include cyclopropyl, cyclobutyl, cyclopentyl, cyclohexyl and the like, but is not limited thereto.

The term "aryl group" as used in the present invention means a single or multiple aromatic carbon-based ring having 6 to 20 carbon atoms. Examples thereof may include a phenyl group, a biphenyl group, a fluorene group and the like, but are not limited thereto.

The term "alkanediyl" as used in the present invention is a divalent atomic group subtracting two hydrogen atoms from alkane, is also referred to as alkylene, and may be represented by a general formula of $-C_nH_{2n}-$.

The term "alkenediyl" as used in the present invention is a divalent atomic group subtracting two hydrogen atoms from alkene, and may be represented by a general formula of $-C_nH_n-$.

The term "alkynediyl" as used in the present invention is a divalent atomic group subtracting two hydrogen atoms from alkyne.

The term "arylene group" as used in the present invention means a divalent aromatic carbon-based ring, and the number of carbon atoms may be from 6 to 40, and specifically from 6 to 20. The arylene group may include a structure in which two or more rings are fused or bond, and the other ring may be aromatic, non-aromatic or a combination thereof. For example, the arylene group may include phenylene, biphenylene, naphthylene, anthracenylene and the like, but is not limited thereto.

The term "arylalkylene group" as used in the present invention is a divalent linking group including an arylene group or a heteroarylene group on one end of the alkylene group, and the number of carbon atoms may be from 6 to 40, and specifically from 6 to 20.

In the above Formula 1, at least one of A and B is partially or fully substituted with fluorine.

A is a monovalent hydrocarbon group substituted with at least one fluorine. Preferably, A may be an alkyl group having 1 to 10 carbon atoms unsubstituted or substituted with fluorine; an alkenyl group having 2 to 10 carbon atoms unsubstituted or substituted with fluorine; an alkynyl group having 2 to 10 carbon atoms unsubstituted or substituted with fluorine; a cycloalkyl group having 3 to 15 carbon atoms unsubstituted or substituted with fluorine; or an aryl group having 6 to 20 carbon atoms unsubstituted or substituted with fluorine. More preferably, A may be an alkyl group having 1 to 10 carbon atoms unsubstituted or substituted with fluorine.

B is a simple bond or a divalent hydrocarbon group substituted with at least one fluorine. B may be preferably an alkanediyl group having 1 to 5 carbon atoms unsubstituted or substituted with fluorine; an alkenediyl group having 2 to 5 carbon atoms unsubstituted or substituted with fluorine; or an unsubstituted alkynediyl group having 2 to 10 carbon atoms More preferably, B may be an alkanediyl group having 1 to 5 carbon atoms unsubstituted or substituted with fluorine.

Herein, in order to enhancing the stability and effectively suppressing the side reactions by being stably introduced to the lithium metal layer surface, the sum of the carbon atoms of A and B may be from 1 to 30.

X is a functional group capable of bonding with lithium metal, and may be a thiol group (—SH), an amine group (—NH$_2$) or a hydroxyl group (—OH), and may preferably be a thiol group.

Examples of the surface treatment compound represented by Formula 1 may comprise at least one selected from the group consisting of 1H,1H,2H,2H,3H,3H-perfluoroundecylthiol, 1H,1H,2H,2H-perfluorodecanethiol, 1H,1H,2H,2H-perfluorononanethiol, 1H,1H,2H,2H-perfluoro-1-octanethiol, 1H,1H-perfluorooctylthiol, 1H,1H-perfluoropropylthiol, 2,2,2-trifluoroethanethiol, 1H,1H,2H,2H-perfluoro-1-hexanethiol, 2,3,4,5,6-pentafluorothiophenol, 2,3,5,6-tetrafluorobenzenethiol, 2,4-difluorothiophenol, 3,4-difluorothiophenol, 2-fluorothiophenol, 3-fluorothiophenol, 4-fluorothiophenol, 2-(trifluoromethoxy)thiophenol, 3-(trifluoromethoxy)thiophenol, 2-(trifluoromethyl)benzenethiol, 2,6-difluorobenzyl mercaptan, 3,4-difluorobenzyl mercaptan, 3,5-difluorobenzyl mercaptan, 4-fluorobenzyl mercaptan, 3,5-bis(trifluoromethyl)benzenethiol, 4-trifluoromethylbenzyl mercaptan, 1H,1H-perfluorooctylamine, 1H,1H-heptafluorobutylamine, 1H,1H-perfluorononylamine, 4-(1H,1H,2H,2H-perfluorodecyl)benzylamine, 2,2,3,3,4,4,4-heptafluorobutylamine, 2,2,3,3,3-pentafluoropropylamine, 3,3,3-trifluoropropylamine, 4-fluoro-α-methylbenzyl alcohol, 2-fluoro-3-methylbenzyl alcohol, 4-fluoro-3-methylbenzyl alcohol, 5-fluoro-2-methylbenzyl alcohol, 4-fluoro-3-nitrobenzyl alcohol, 2-fluoro-5-nitrobenzyl alcohol, 2-fluoro-3-(trifluoromethoxy)benzyl alcohol, 2-fluoro-3-nitrobenzyl alcohol, 2-fluoro-5-methoxybenzyl alcohol, 3-fluoro-5-(trifluoromethyl)benzyl alcohol, 3-fluoro-5-methoxybenzyl alcohol, 4-fluoro-3-(trifluoromethyl)benzyl alcohol, 4-fluoro-3-methoxybenzyl alcohol, 5-fluoro-2-(trifluoromethyl)benzyl alcohol, 5-fluoro-2-nitrobenzyl alcohol, DL-4-fluoro-α-propylbenzyl alcohol, 3-fluorobenzyl alcohol and 4-fluorophenethyl alcohol. Preferably, at least one selected from the group consisting of 1H,1H,2H,2H,3H,3H-perfluoroundecylthiol, 1H,1H,2H,2H-perfluoro-1-hexanethiol, 1H,1H,2H,2H-perfluorodecanethiol, 1H,1H,2H,2H-perfluorononanethiol, 1H,1H,2H,2H-perfluoro-1-octanethiol, 1H,1H-perfluorooctylthiol, 1H,1H-perfluorooctylamine, 2,4-difluorothiophenol and 4-fluorophenethyl alcohol may be included. More preferably, at least one selected from the group consisting of 1H,1H,2H,2H-perfluoro-1-hexanethiol, 1H,1H,2H,2H-perfluorodecanethiol, 1H,1H,2H,2H-perfluorononanethiol, 1H,1H,2H,2H-perfluoro-1-octanethiol, 2,4-difluorothiophenol and 4-fluorophenethyl alcohol may be included.

In the lithium electrode according to the present invention, the surface treatment layer may be formed using a surface treatment solution prepared by dissolving the above-described surface treatment compound in a solvent.

The surface treatment solution may include the surface treatment compound and a solvent.

Herein, the solvent capable of being used is not particularly limited as long it has low reactivity and is commonly used in a lithium secondary battery. Examples of the solvent may include at least one selected from the group consisting of ethylene carbonate, propylene carbonate, dimethyl carbonate, diethyl carbonate, γ-butyrolactone, ethylmethyl carbonate, dioxolane, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, polyethylene glycol methylethyl ether, N-methyl pyrrolidone, tetrahydrofuran, 2-methyltetrahydrofuran and dimethyl sulfoxide. The solvent may preferably include at least one selected from the group consisting of tetrahydrofuran and 2-methyltetrahydrofuran.

The surface treatment compound may be included in an amount of from 0.1 to 10% by weight and preferably from 0.5 to 5% by weight, based on the total weight of the surface treatment solution. When the surface treatment compound content is less than the above-mentioned range, target effects may not be obtained since surface treatment on the lithium metal layer is not uniform, whereas, when the content is greater than the above-mentioned range, battery performance may decline caused by unnecessary reactions when operating a battery.

The surface treatment layer is formed by reacting the above-described surface treatment solution with the lithium metal layer under inert atmosphere, and then drying the result. In the prior art, since the lithium metal electrode protective layers are formed from a coating composition including a material stabilizing a lithium metal surface, a separate coating and curing processes are required. In comparison with this, the surface treatment layer of the present invention is readily formed through a reaction with a surface treatment solvent, which is advantageous in terms of a preparation method as well.

The inert atmosphere may be formed by injecting inert gas such as nitrogen or argon while excluding oxygen and moisture.

Generally, the lithium metal readily reacts even with a small amount of moisture, and therefore, a purification process removing moisture included in the surface treatment solution may be additionally performed. As an example, the purification process may use molecular sieves. The surface treatment solution of the present invention includes moisture in 10 ppm or less through the purification process, and therefore, the reaction with the lithium metal may be stably performed.

In the forming of the surface treatment layer, the reaction between the surface treatment solution and the lithium metal layer may use surface treatment methods commonly used in the prior art such as immersing the lithium metal layer into the surface treatment solution or coating the surface treatment solution on the lithium metal layer surface. Herein, the reaction time and the reaction temperature are not particularly limited, and may be controlled depending on the concentration of the surface treatment solution and the degree of the surface treatment layer formation.

After the reaction between the lithium metal layer and the surface treatment solution, washing and drying processes may be selectively performed on the surface treated-lithium metal layer. Herein, the drying may be carried out through natural drying, NIR drying or UV drying for 0.1 hour to 1 hour at 20° C. to 200° C.

As described above, by introducing the surface treatment layer including the surface treatment compound represented by Formula 1, the lithium electrode according to the present invention is capable of securing excellent stability by effectively suppressing the side reactions of the lithium metal electrode, and as a result, is capable of improving charge and discharge performance and lifetime of a battery.

In addition, the present invention provides a lithium secondary battery including the lithium electrode as a negative electrode.

The lithium secondary battery includes a positive electrode, a negative electrode, and an electrolyte interposed between the positive electrode and the negative electrode, wherein, as the negative electrode, the lithium electrode according to the present invention is included.

The positive electrode may include a positive electrode current collector and a positive electrode active material coated on one or both sides of the positive electrode current collector.

The positive electrode current collector supports the positive electrode active material and is not particularly limited as long as it has high conductivity without inducing chemical changes to the corresponding battery. For example, copper, stainless steel, aluminum, nickel, titanium, palladium, baked carbon, copper or stainless steel of which surface is treated with carbon, nickel, silver and the like, aluminum-cadmium alloys, and the like, may be used.

The positive electrode current collector may strengthen binding strength with the positive electrode active material by forming micro-unevenness on its surface, and various forms such as films, sheets, foil, meshes, nets, porous bodies, foams and non-woven fabrics may be used.

The positive electrode active material may selectively include a conductive material and a binder together with the positive electrode active material.

The positive electrode active material may include layer compounds or compounds substituted with one or more transition metals such as lithium cobalt oxide ($LiCoO_2$) or lithium nickel oxide ($LiNiO_2$); lithium manganese oxides such as a chemical formula of $Li_{1+x}Mn_{2-x}O_4$ ($0 \leq x \leq 0.33$), $LiMnO_3$, $LiMn_2O_3$ or $LiMnO_2$; lithium copper oxide ($Li_2CuO_2$); vanadium oxides such as $LiV_3O_8$, $LiFe_3O_4$, $V_2O_5$ or $Cu_2V_2O_7$; Ni site-type lithium nickel oxides represented by a chemical formula of $LiN_{1-x}M_xO_2$ (M=Co, Mn, Al, Cu, Fe, Mg, B or Ga; $0.01 \leq x \leq 0.3$); lithium manganese composite oxides represented by a chemical formula of $LiMn_{2-x}M_xO_2$ (M=Co, Ni, Fe, Cr, Zn or Ta; $0.01 \leq x \leq 0.1$) or $Li_2Mn_3MO_8$ (M=Fe, Co, Ni, Cu or Zn); spinel-structured lithium manganese composite oxides represented by $LiN_{i_x}Mn_{2-x}O_4$; $LiCoPO_4$; $LiFePO_4$; elemental sulfur ($S_8$); sulfur series compounds such as $Li_2S_n$ ($n \geq 1$), organosulfur compounds or carbon-sulfur polymers (($C_2S_x)_n$: x=2.5 to 50, $n \geq 2$), but is not limited thereto.

The conductive material is for enhancing electric conductivity and is not particularly limited as long as it is an electron conductive material that does not cause chemical changes in the lithium secondary battery.

Carbon black, graphite, carbon fibers, carbon nanotubes, metal powders, conductive metal oxides, organic conductive material and the like may be generally used. Products commercially available as the conductive material may include acetylene black series (products of Chevron Chemical Company or Gulf Oil Company, and the like), Ketjen Black EC series (products of Armak Company), Vulcan XC-72 (products of Cabot Company), Super P (products of MMM) and the like. For example, acetylene black, carbon black, graphite and the like may be included.

In addition, the positive electrode active material may further include a binder having functions of maintaining the positive electrode active material on the positive electrode current collector and linking between the active materials. Examples of the binder may include various types of binders such as polyvinylidene fluoride-hexafluoropropylene (PVDF-co-HFP), polyvinylidene fluoride (PVDF), polyacrylonitrile, polymethyl methacrylate, styrene butadiene rubber (SBR), carboxyl methyl cellulose (CMC), poly (acrylic acid) (PAA) or poly(vinyl alcohol) (PVA).

The negative electrode follows the descriptions described above.

The electrolyte includes lithium ions, and using them as a medium, performs an electrochemical oxidation or reduction reaction in the positive electrode and the negative electrode.

The electrolyte may be a non-aqueous electrolyte liquid or a solid electrolyte that does not react with lithium metal. The electrolyte may be preferably a non-aqueous electrolyte and include an electrolyte salt and an organic solvent.

The electrolyte salt included in the non-aqueous electrolyte liquid may be a lithium salt. The lithium salt may be used without limit as long as it is commonly used in an electrolyte liquid for a lithium secondary battery. For example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, $LiN(SO_2F)_2$, chloroborane lithium, lower aliphatic carboxylic acid lithium, lithium tetraphenylborate, lithium imide and the like may be used.

As the organic solvent included in the non-aqueous electrolyte liquid, those commonly used in an electrolyte liquid for a lithium secondary battery may be used without limit, and for example, ether, ester, amide, linear carbonate, cyclic carbonate and the like may be used either alone or as a mixture of two or more types. Among these, ether-based compounds may be typically included.

The ether-based compound may include non-cyclic ether and cyclic ether.

Examples of the non-cyclic ether may include at least one from the group consisting of dimethyl ether, diethyl ether, dipropyl ether, methylethyl ether, methylpropyl ether, ethylpropyl ether, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether and polyethylene glycol methylethyl ether, but are not limited thereto.

As an example, the cyclic ether may include at least one selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxybenzene, 1,3-dimethoxybenzene, 1,4-dimethoxybenzene and isosorbide dimethyl ether, but is not limited thereto.

As the ester among the organic solvents, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types thereof may be used, however, the ester is not limited thereto.

Specific examples of the linear carbonate compound may include any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more types thereof, but are not limited thereto.

Specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof. Examples of the halides thereof may include fluoroethylene carbonate (FEC) and the like, but are not limited thereto.

The non-aqueous electrolyte liquid may be injected at a proper stage in an electrochemical device manufacturing process depending on a manufacturing process and required properties of a final product. In other words, the non-aqueous electrolyte liquid may be injected at a stage prior to assembling an electrochemical device or at a final stage of electrochemical device assembly.

A separator may be further included between the positive electrode and the negative electrode described above. The separator is for physically separating both electrodes in the lithium secondary battery of the present invention, and is not particularly limited as long as it is commonly used as a separator in a lithium secondary battery. Particularly, it is desirable to use one having excellent wettability to the electrolyte liquid while having low resistance for ion migration of the electrolyte are preferred.

The separator may be formed with a porous substrate, and as the porous substrate, porous substrates commonly used in an electrochemical device may all be used. Examples thereof may include a polyolefin-based porous membrane or non-woven fabric, but are not limited thereto.

Examples of the polyolefin-based porous membrane may include membranes formed with a polymer using a polyolefin-based polymer such as polyethylene such as high density polyethylene, linear low density polyethylene, low density polyethylene and ultra-high molecular weight polyethylene, polypropylene, polybutylene and polypentene alone, or formed with a polymer mixing these.

Examples of the non-woven fabric other than the polyolefin-based non-woven fabric may include non-woven fabrics formed with a polymer using polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate and the like alone, or formed with a polymer mixing these. The non-woven fabric structure may be a spunbond non-woven fabric or meltblown non-woven fabric formed with long fibers.

The thickness of the porous substrate is not particularly limited, but may be from 1 μm to 100 μm and preferably from 5 μm to 50 μm.

Sizes of pores and porosity present in the porous substrate are not particularly limited as well, however, the pore size and the porosity may be from 0.001 μm to 50 μm and from 10% to 95%, respectively.

The lithium secondary battery according to the present invention may be manufactured by lamination (stack) and folding processes of a separator and an electrode. in addition to usual winding process.

A shape of the lithium secondary battery is not particularly limited, and may be various shapes such as a cylinder-type, a lamination-type or a coin-type.

MODE FOR INVENTION

Example and Comparative Example

Example 1

1% by weight of a surface treatment solution was prepared by dissolving 1% by weight of 1H,1H,2H,2H-perfluorodecanethiol in 2-methyltetrahydrofuran. Moisture was removed from the prepared surface treatment solution using molecular sieves so that the moisture amount in the solution became 10 ppm or less.

Subsequently, after reacting the prepared surface treatment solution and a lithium metal thin film having a thickness of 40 μm for 1 hour inside a glove box, the result was washed for 10 minutes using 2-methyltetrahydrofuran, and then dried for 10 minutes at room temperature (20° C.) to prepare a surface treatment layer-formed lithium electrode. The lithium electrode obtained as above was used as a negative electrode.

Next, an electrolyte liquid was prepared by dissolving a 1 M concentration of lithium bis(trifluoromethanesulfonyl)imide (LiTFSI) and 1% by weight of lithium nitrate ($LiNO_3$) in an organic solvent formed with 1,3-dioxolane and dimethyl ether (DOL:DME=1:1 (volume ratio)).

A Li/Li symmetric cell was manufactured using the prepared negative electrode and the electrolyte liquid, and a lithium metal counter electrode and a polyethylene separator.

Example 2

Sulfur was mixed with a conductive material and a binder in acetonitrile using a ball mill to prepare positive electrode active material slurry. Herein, carbon black was used as the conductive material, polyethylene oxide (molecular weight 5,000,000 g/mol) was used as the binder, and the mixing ratio of the sulfur:conductive material:binder employed was 60:20:20 in a weight ratio. The positive electrode active material slurry was coated on an aluminum current collector, and the result was dried to prepare a positive electrode.

Next, a surface treatment solution was prepared by dissolving 1% by weight of 1H,1H,2H,2H-perfluorodecanethiol in 2-methyltetrahydrofuran. Moisture was removed from the prepared surface treatment solution using molecular sieves so that the moisture amount in the solution became 10 ppm or less.

Subsequently, after reacting the prepared surface treatment solution and a lithium metal thin film having a thickness of 40 μm for 1 hour inside a glove box, the result was washed for 10 minutes using 2-methyltetrahydrofuran, and then dried for 10 minutes at room temperature (20° C.) to prepare a surface treatment layer-formed lithium electrode. The lithium electrode obtained as above was used as a negative electrode.

Next, an electrolyte liquid was prepared by dissolving a 1 M concentration of lithium bis(trifluoromethanesulfonyl)imide (LiTFSI) and 1% by weight of lithium nitrate ($LiNO_3$) in an organic solvent formed with 1,3-dioxolane and dimethyl ether (DOL:DME=1:1 (volume ratio)).

Next, the prepared positive electrode and the negative electrode were placed to face each other, and after interposing a polyethylene separator therebetween, 100 μl of the prepared electrolyte liquid was injected thereto to manufacture a coin-type lithium-sulfur battery.

Example 3

A coin-type lithium-sulfur battery was manufactured in the same manner as in Example 2 except that CMC/SBR was used as the binder when preparing the positive electrode and 70 μl of the electrolyte liquid was injected.

Example 4

A coin-type lithium-sulfur battery was manufactured in the same manner as in Example 3 except that the mixing ratio of the sulfur:conductive material:binder used was 80:10:10 in a weight ratio when preparing the positive electrode.

Example 5

A coin-type lithium-sulfur battery was manufactured in the same manner as in Example 4 except that a surface treatment solution dissolving 1% by weight of 2,4-difluorothiophenol in tetrahydrofuran was used when preparing the negative electrode.

Example 6

A coin-type lithium-sulfur battery was manufactured in the same manner as in Example 4 except that a surface treatment solution dissolving 1% by weight of 1H,1H,2H,2H-perfluoro-1-octanethiol was used when preparing the negative electrode.

Example 7

A coin-type lithium-sulfur battery was manufactured in the same manner as in Example 4 except that a surface treatment solution dissolving 1% by weight of 1H,1H,2H,2H-perfluorononanethiol was used when preparing the negative electrode.

Example 8

A coin-type lithium-sulfur battery was manufactured in the same manner as in Example 4 except that a surface treatment solution dissolving 1% by weight of 1H,1H,2H,2H-perfluoro-1-hexanethiol was used when preparing the negative electrode.

Example 9

A coin-type lithium-sulfur battery was manufactured in the same manner as in Example 4 except that a surface treatment solution dissolving 1% by weight of 1H,1H-perfluorooctylamine was used when preparing the negative electrode.

Example 10

A coin-type lithium-sulfur battery was manufactured in the same manner as in Example 4 except that a surface treatment solution dissolving 1% by weight of 4-fluorophenethyl alcohol was used when preparing the negative electrode.

Comparative Example 1

A Li/Li symmetric cell was manufactured in the same manner as in Example 1 except that a lithium metal thin film having a thickness of 40 μm in which a surface treatment layer was not formed was used as the negative electrode.

Comparative Example 2

A coin-type lithium-sulfur battery was manufactured in the same manner as in Example 2 except that a lithium metal thin film having a thickness of 40 μm in which a surface treatment layer was not formed was used as the negative electrode.

Comparative Example 3

A coin-type lithium-sulfur battery was manufactured in the same manner as in Example 3 except that a lithium metal thin film having a thickness of 40 μm in which a surface treatment layer was not formed was used as the negative electrode.

Comparative Example 4

A polyvinylidene fluoride-hexafluoropropylene coating layer-formed lithium electrode having a thickness of 1 μm was prepared through spin-coating on a lithium metal thin film having a thickness of 40 μm punched using a polymer solution dissolving 5% by weight of polyvinylidene fluoride-hexafluoropropylene (molecular weight 110,000 g/mol) in acetone.

A coin-type lithium-sulfur battery was manufactured in the same manner as in Example 3 except that the lithium electrode obtained as above was used as the negative electrode.

Comparative Example 5

A coin-type lithium-sulfur battery was manufactured in the same manner as in Example 4 except that a lithium metal thin film having a thickness of 40 μm in which a surface treatment layer was not formed was used as the negative electrode.

Compositions of the surface treatment layers of the negative electrodes according to the examples and the comparative examples are summarized in the following Table 1.

TABLE 1

| | Surface Treatment Layer |
|---|---|
| Example 1 | 1H,1H,2H,2H-perfluorodecanethiol |
| Example 2 | 1H,1H,2H,2H-perfluorodecanethiol |
| Example 3 | 1H,1H,2H,2H-perfluorodecanethiol |
| Example 4 | 1H,1H,2H,2H-perfluorodecanethiol |
| Example 5 | 2,4-difluorothiophenol |
| Example 6 | 1H,1H,2H,2H-perfluoro-1-octanethiol |
| Example 7 | 1H,1H,2H,2H-perfluorononanethiol |
| Example 8 | 1H,1H,2H,2H-perfluoro-1-hexanethiol |
| Example 9 | 1H,1H-perfluorooctylamine |
| Example 10 | 4-fluorophenethyl alcohol |
| Comparative Example 1 | — |
| Comparative Example 2 | — |
| Comparative Example 3 | — |
| Comparative Example 4 | Polyvinylidene Fluoride-Hexafluoropropylene |
| Comparative Example 5 | — |

Experimental Example 1: Evaluation on Resistance of Li/Li Symmetric Cell

Resistance of the Li/Li symmetric cells manufactured in Example 1 and Comparative Example 1 was measured at regular time intervals using an electrochemical impedance spectroscopy (EIS) method. The results obtained herein are shown in FIG. 1.

When referring to FIG. 1, the resistance of the Li/Li symmetric cells according to Example 1 and Comparative Example 1 gradually increased after slightly decreasing at the beginning, and converged to a constant value. It was identified that the resistance decreased at the beginning while wetting of an electrolyte progressed, and resistance gradually increased while forming a passivation layer as time passed by, and a constant value was finally obtained. When comparing the final resistance values, it was identified that the resistance of the Li/Li symmetric cell according to Example 1 was lower than in Comparative Example 1, which is advantageous when manufacturing a battery.

Experimental Example 2: Evaluation on Battery Performance 1

Lifetime properties were checked by measuring discharge capacity and Coulombic efficiency while repeatedly discharging and charging the batteries manufactured in Example 2 and Comparative Example 2 2.5 times with current density of 0.1 C, and then progressing discharge and charge with current density of 0.2 C. The results obtained herein are shown in FIG. 2.

After completing the cycle, each of the batteries was dissembled, and the separator surface on the negative electrode side was observed using a scanning electron microscope (S-4800, HITACHI Ltd.). The results obtained herein are shown in FIG. 3 and FIG. 4.

Figure 2:
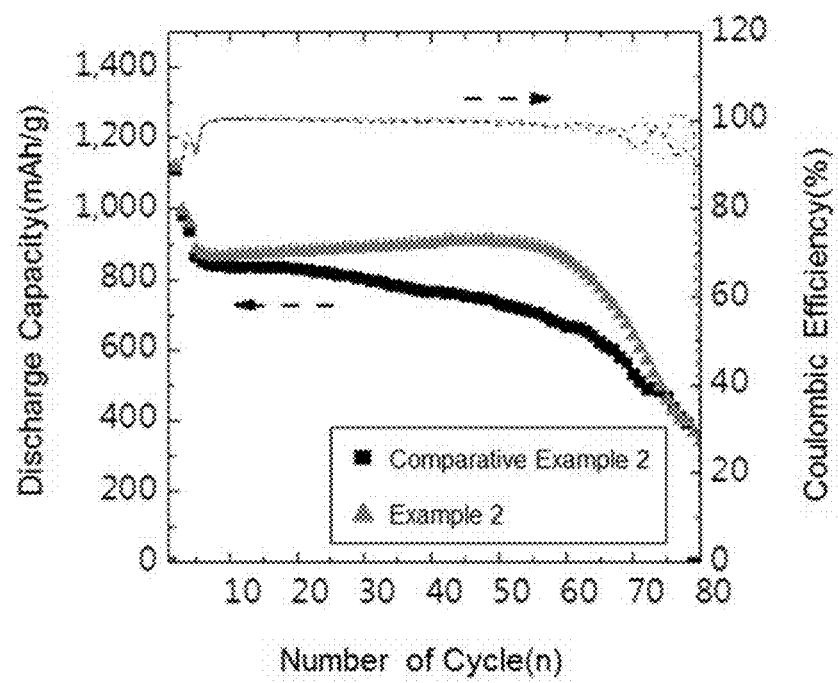
FIG. 2 is a graph showing a result of evaluating battery performance according to Experimental Example 2 of the present invention.

According to FIG. 2, it was identified that the lifetime properties of the battery according to Example 2 were excellent compared to Comparative Example 2.

Specifically, through FIG. 2, it was seen that, when using the lithium electrode including the surface treatment layer according to the present invention, the discharge capacity value was higher compared to Comparative Example 2, and the capacity retention rate was excellent as well, and lifetime properties were more enhanced.

Figure 3:
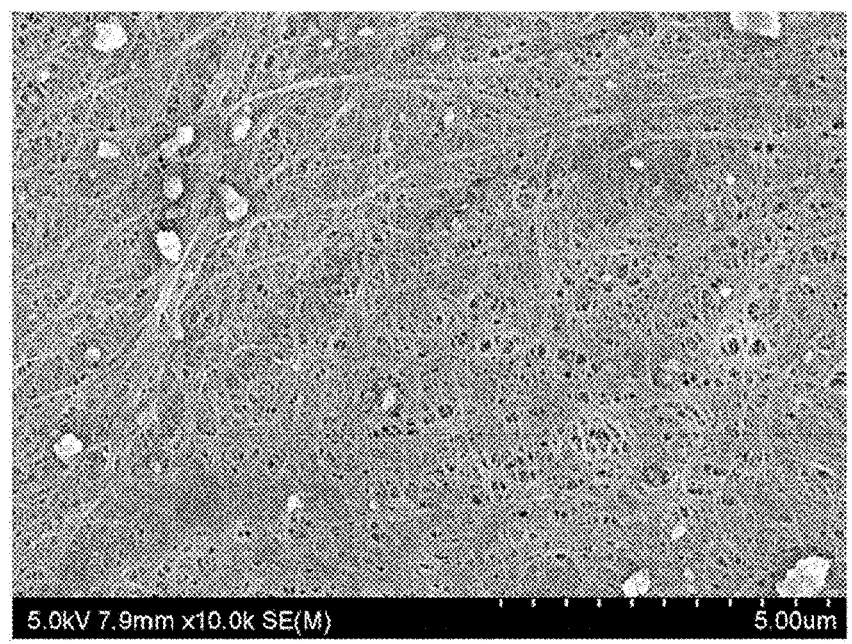
FIG. 3 is a diagram showing a scanning electron microscope image of a separator after evaluating performance according to Experimental Example 2 on a battery manufactured in Example 2 of the present invention.
Figure 4:
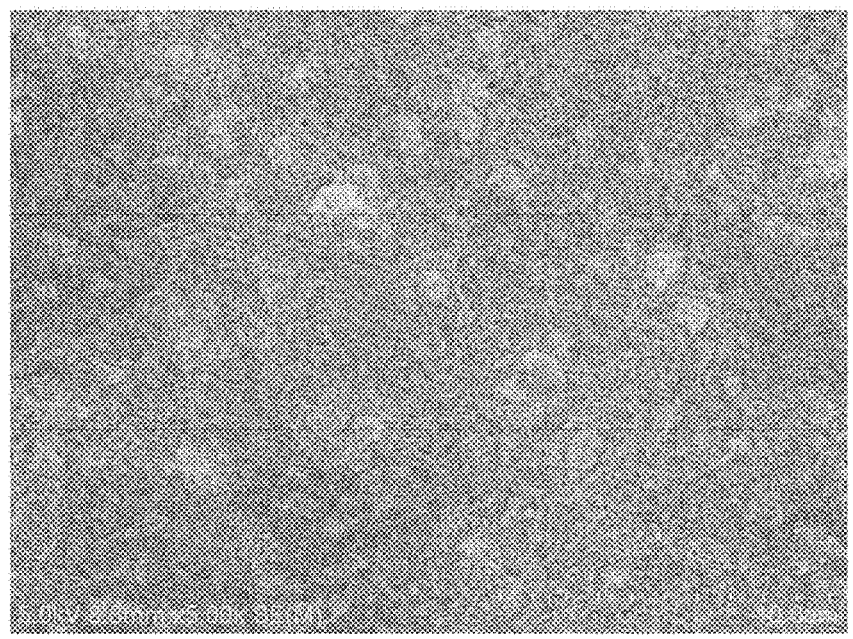
FIG. 4 is a diagram showing a scanning electron microscope image of a separator after evaluating performance according to Experimental Example 2 on a battery manufactured in Comparative Example 2 of the present invention.

In addition, as shown in FIG. 3, pores unique to a separator were identified although some materials looking like a salt were observed in the separator of Example 2. In comparison, it was identified that impurities were formed too thick to see pores in the separator of Comparative Example 2 in FIG. 4. This indicates that the lithium electrode according to the present invention exhibited more improved stability compared to existing lithium electrodes.

Experimental Example 3: Evaluation on Battery Performance 2

For the batteries manufactured in Example 3, Comparative Example 3 and Comparative Example 4, non-discharge capacity was measured while progressing a cycle with regularly repeating charge and discharge rates (C-rate) to check lifetime properties. The results obtained herein are shown in FIG. 5.

Figure 5:
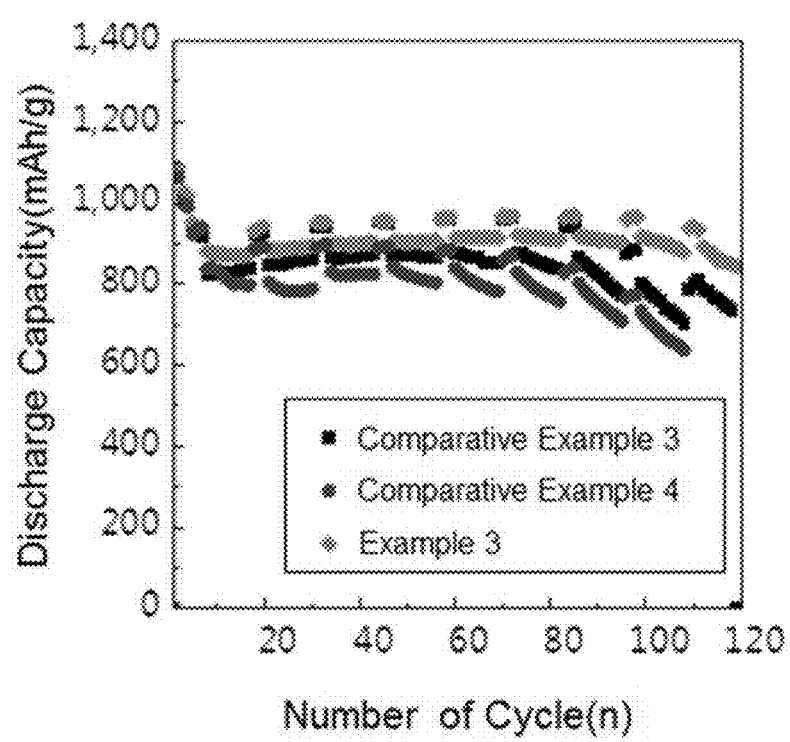
FIG. 5 is a graph showing a result of evaluating battery performance according to Experimental Example 3 of the present invention.

According to FIG. 5, it was identified that the battery of Example 3 had more superior lifetime properties compared to Comparative Examples 3 and 4. Specifically, through FIG. 5, it was seen that, when using the lithium electrode including the surface treatment layer according to the present invention, the discharge capacity value was higher compared to Comparative Example 3 that did not form a surface treatment layer and Comparative Example 4 forming a coating layer with a fluorine-based polymer material as a protective layer of lithium metal as is in the art, and the capacity retention rate was excellent as well, and lifetime properties were more enhanced.

Experimental Example 4: Evaluation on Battery Performance 3

Lifetime properties were checked by measuring discharge capacity and Coulombic efficiency while progressing a cycle with limiting discharge capacity of the batteries manufactured in Example 4 and Comparative Example 5 to be the same (650 mAh/g). The results obtained herein are shown in FIG. 6.

Figure 6:
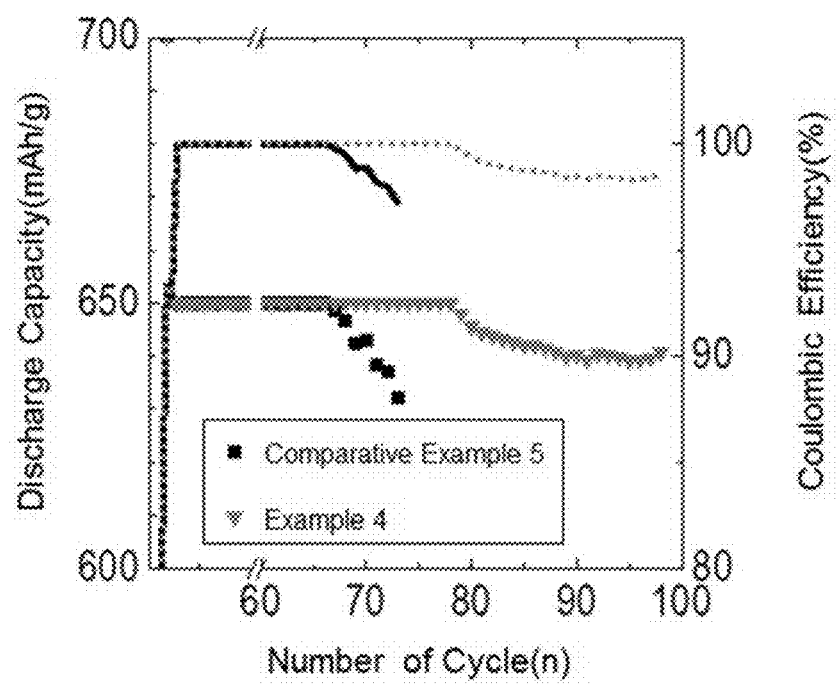
FIG. 6 is a graph showing a result of evaluating battery performance according to Experimental Example 4 of the present invention.

As shown in FIG. 6, the battery according to Example 4 had enhanced lifetime properties compared to Comparative Example 5, and through Example 4, it was identified that electrochemical properties and stability of the lithium metal electrode were improved through introducing the surface treatment layer according to the present invention regardless of a positive electrode type.

Experimental Example 5: Evaluation on Battery Performance 4

Lifetime properties were measured by measuring discharge capacity while progressing a cycle in the same manner as in Experimental Example 4 on the batteries manufactured in Example 5 and Comparative Example 5. The results obtained herein are shown in FIG. 7.

Figure 7:
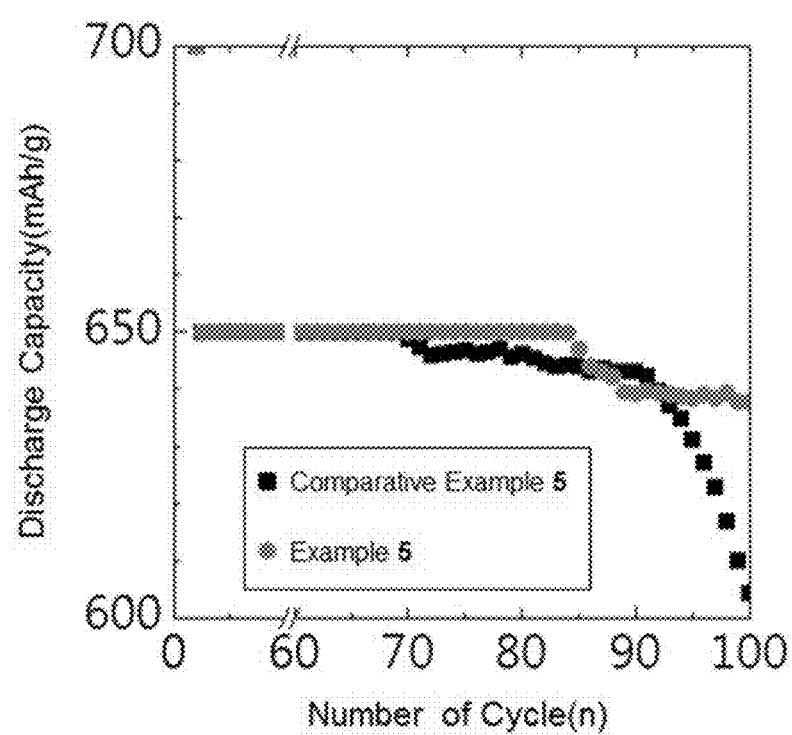
FIG. 7 is a graph showing a result of evaluating battery performance according to Experimental Example 5 of the present invention.

When referring to FIG. 7, it was seen that the battery according to Example 5 including the lithium electrode according to the present invention had more superior lifetime properties compared to the battery according to Comparative Example 5 using a lithium electrode in which a surface treatment layer was not formed.

INDUSTRIAL APPLICABILITY

By being provided with a surface treatment layer including specific functional groups on a lithium metal layer, the lithium electrode according to the present invention improves stability as well as suppressing side reactions of the lithium metal, and thereby allows high capacity, high stability and long lifetime of a lithium secondary battery.

The invention claimed is:

1. A lithium electrode comprising:
   a lithium metal layer; and
   a surface treatment layer formed on the lithium metal layer,
   wherein the surface treatment layer comprises a surface treatment compound comprising at least one selected from the group consisting of 1H,1H,2H,2H-perfluorodecanethiol, 1H,1H,2H,2H-perfluorononanethiol, 1H,1H,2H,2H-perfluoro-1-octanethiol, 1H,1H,2H,2H-perfluoro-1-hexanethiol, 1H,1H-perfluorooctylamine, and 4-fluorophenethyl alcohol.

2. The lithium electrode of claim 1, wherein the lithium metal layer comprises lithium metal or a lithium alloy.

3. A method for preparing a lithium electrode comprising:
   (a) preparing a lithium metal layer;
   (b) preparing a surface treatment solution including a surface treatment compound comprising at least one selected from the group consisting of 1H,1H,2H,2H-perfluorodecanethiol, 1H,1H,2H,2H-perfluorononanethiol, 1H,1H,2H,2H-perfluoro-1-octanethiol, 1H,1H,2H,2H-perfluoro-1-hexanethiol, 1H,1H-perfluorooctylamine, and 4-fluorophenethyl alcohol; and
   (c) forming a surface treatment layer by reacting the lithium metal layer of (a) with the surface treatment solution prepared in (b) under an inert atmosphere, and then drying the result.

4. The method for preparing a lithium electrode of claim 3, wherein the surface treatment compound is present in the surface treatment solution in an amount of from 0.1 to 10% by weight, based on the total weight of the surface treatment solution.

5. A lithium secondary battery comprising:
   a positive electrode;
   a negative electrode; and
   an electrolyte interposed between the positive electrode and the negative electrode,
   wherein the negative electrode includes the lithium electrode of claim 1.

* * * * *